United States Patent
Lee et al.

(10) Patent No.: US 6,765,962 B1
(45) Date of Patent: Jul. 20, 2004

(54) ADAPTIVE SELECTION OF QUANTIZATION SCALES FOR VIDEO ENCODING

(75) Inventors: Jungwoo Lee, Princeton, NJ (US); Nurit Binenbaum, East Windsor, NJ (US)

(73) Assignee: Sarnoff Corporation, Princeton, NJ (US)

(*) Notice: Subject to any disclaimer, the term of this patent is extended or adjusted under 35 U.S.C. 154(b) by 448 days.

(21) Appl. No.: 09/717,420

(22) Filed: Nov. 21, 2000

Related U.S. Application Data

(60) Provisional application No. 60/168,552, filed on Dec. 2, 1999.

(51) Int. Cl.[7] .............................. H04B 1/66; H04N 7/24; G06K 9/38
(52) U.S. Cl. .................................. 375/240.03
(58) Field of Search ........................ 375/240, 240.01, 375/240.03, 240.04, 240.07, 240.16; 348/384.1, 390.1, 400.1, 403.1, 405.1, 419.1; 382/232, 234, 236, 238, 250, 251; G06K 9/36; H04N 7/24; H04B 1/66

(56) References Cited

U.S. PATENT DOCUMENTS

| | | | | |
|---|---|---|---|---|
| 4,851,906 A | * | 7/1989 | Koga et al. ............... | 348/413.1 |
| 5,632,003 A | * | 5/1997 | Davidson et al. ......... | 704/200.1 |
| 5,663,763 A | * | 9/1997 | Yagasaki et al. ........ | 375/240.03 |
| 5,974,184 A | * | 10/1999 | Eifrig et al. ................ | 382/236 |
| 6,023,296 A | * | 2/2000 | Lee et al. ................ | 348/405.1 |
| 6,072,831 A | * | 6/2000 | Chen ..................... | 375/240.03 |
| 6,192,081 B1 | * | 2/2001 | Chiang et al. .......... | 375/240.16 |
| 6,243,497 B1 | * | 6/2001 | Chiang et al. .............. | 382/251 |

* cited by examiner

*Primary Examiner*—Tung T. Vo
(74) *Attorney, Agent, or Firm*—William J. Burke

(57) ABSTRACT

The quantization scale selected for encoding the current frame of a video sequence is selected based on a metric generated based on a set of image data in the video sequence. For example, in MPEG encoding, the linear quantization scale is selected for use in encoding the current frame if the average quantization level used to encode the previously encoded frame is between specified high and low thresholds. Otherwise, the non-linear quantization scale is selected. As a result, medium-difficulty sequences will tend to be encoded using the linear quantization scale, while low- and high-difficulty sequences will tend to be encoded using the non-linear quantization scale. For most normal video sequences, this will result in fewer incidents of panic mode video compression processing and improved picture quality.

24 Claims, 3 Drawing Sheets

ADAPTIVE SELECTION OF QUANTIZATION SCALES FOR VIDEO ENCODING

BACKGROUND OF THE INVENTION

This Application claims the benefit of U.S. Provisional Application Serial No. 60/168,552 filed Dec. 2, 1999.

STATEMENT REGARDING FEDERALLY SPONSORED RESEARCH OR DEVELOPMENT

The Government of the United States of America has rights in this invention pursuant to NIST Contract No. 70NANB5H1178 awarded by the National Institute of Standards and Technology.

FIELD OF THE INVENTION

The present invention relates to video compression processing, and, in particular, to the selection of quantization levels used to quantize DCT coefficients during MPEG video encoding.

DESCRIPTION OF THE RELATED ART

MPEG refers to a family of video compression standards promulgated by the Motion Picture Experts Group. According to the MPEG standards, the frames of a video sequence may be encoded as either I, P, or B frames. An I frame is intra-encoded without reference to any other frames, while P and B frames are inter-encoded based on inter-frame pixel differences to exploit the temporal redundancy that typically exists between frames of a video sequence. I and P frames can be used as reference frames for inter-encoding other P or B frames, while B frames are never used as reference frames for inter-encoding other frames.

FIG. 1 shows a block diagram of the intra-encoding performed for I frames, according to the MPEG standards. As shown in FIG. 1, a block-based discrete cosine transform (DCT) is applied to each (8×8) block of pixels in the current frame to generate blocks of DCT coefficients, which represent the image data in a spatial frequency domain (block 102). Each block of DCT coefficients is then quantized based on selected quantization levels (block 104), and the resulting quantized DCT coefficients are then run-length encoded (block 106) and Huffman (variable-length) encoded (block 108) to generate the current frame's contribution to the encoded video bitstream.

FIG. 2 shows a block diagram of the inter-encoding performed for P and B frames, according to the MPEG standards. As shown in FIG. 2, motion estimation is performed for each (16×16) macroblock of pixels in the current frame to identify a closely matching set of pixel data corresponding to one or more reference frames (block 202). Motion compensation is then performed based on the motion vectors determined during the motion estimation processing of block 202 to determine the motion-compensated pixel-to-pixel inter-frame differences for each macroblock in the current frame (block 204). A DCT transform is then applied to each (8×8) block of inter-frame pixel differences in the current frame to generate blocks of DCT coefficients (block 206). Each block of DCT coefficients is then quantized based on selected quantization levels (block 208), and the resulting quantized DCT coefficients are then run-length encoded (block 210) and Huffman encoded (block 212) to generate the current frame's contribution to the encoded video bitstream. Note that the encoding of the motion vectors determined during the motion estimation processing of block 202 is not represented in FIG. 2, but is part of the MPEG video compression processing for P and B frames.

The MPEG standards provide two different quantization scales that define different sets of quantization levels that are available for selection for use during the quantization processing of either block 104 in the intra-encoding algorithm shown in FIG. 1 or block 208 in the inter-encoding algorithm shown in FIG. 2: a linear quantization scale and a non-linear quantization scale. The linear quantization scale is typically used for decoding MPEG-compliant bitstreams. The linear quantization scale defines a set of 31 quantization levels that range from 2 to 62 in increments of 2, while the non-linear quantization scale defines a set of 31 quantization levels that range from 1 to 112 as follows: 1 to 8 in increments of 1, 8 to 24 in increments of 2, 24 to 56 in increments of 4, and 56 to 112 in increments of 8.

In most MPEG-compliant video compression algorithms, quantization level is the primary encoding parameter used to trade-off between bit rate and picture quality of the decoded video sequence during playback of the encoded video bitstream. In general, both bit rate and picture quality are inversely proportional to quantization level. Lower bit rates can typically be achieved by using higher quantization levels, but at the expense of lower picture quality. On the other hand, higher picture quality can typically be achieved by using lower quantization levels, but at the expense of higher bit rates.

MPEG-compliant video compression algorithms enable users to carefully select quantization levels to trade-off between bit rate and picture quality to meet particular application requirements. In some applications, such as real-time video conferencing over plain old telephone service (POTS) lines, picture quality is often sacrificed in order to achieve low bit rates. In these applications, relatively high quantization levels are typically used. In other applications, such as video compression for non-real-time playback where higher bit rates are acceptable, relatively low quantization levels can be used to achieve high picture quality during video playback.

Before selecting the specific quantization levels to use for different blocks of DCT coefficients, an MPEG encoder must first decide which quantization scale to use. As mentioned earlier, either the linear or the non-linear quantization scale can be chosen for MPEG-compliant decoding. The MPEG standards allow an encoder to change quantization scale from frame to frame during video compression processing. The selection between the linear and non-linear quantization scales can greatly affect the ability of the MPEG encoder to trade-off efficiently between bit rate and picture quality to achieve its application-specific performance requirements.

In general, the linear quantization scale allows medium grain control at 31 equally spaced quantization values. The non-linear quantization scale offers 31 quantization values having a broader range with finer granularity at the lower end and coarser granularity at the higher end. When using the linear scale, in some situations when the required quantization level is beyond the range provided, serious degradation in the resulting compressed image may occur, because the encoder is forced to throw away information in order to stay within the bit allocation. The non-linear quantization scale offers the encoder more latitude in avoiding this degradation. However, the coarser granularity of the high non-linear quantization levels may introduce image artifacts such as blockiness caused by large quantization discontinuities at macroblock boundaries. Thus, the linear quantization scale is generally better at reducing artifacts within a given ranges of quantization levels, while the non-linear quantization scale is generally better outside of this range.

SUMMARY OF THE INVENTION

The present invention is directed to a technique for adaptively selecting between different quantization scales during video compression processing. For example, for MPEG encoding, the present invention may be applied to adaptively select between the linear quantization scale and the non-linear quantization scale used during video compression processing to select the specific quantization levels for quantizing DCT coefficients.

According to one embodiment, the present invention is a method for encoding frames of a video sequence, comprising the steps of (a) generating a metric characterizing quantization levels corresponding to a set of image data in the video sequence; (b) comparing the metric to one or more specified thresholds to select a quantization scale for a current frame in the video sequence; and (c) encoding the current frame using the selected quantization scale.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
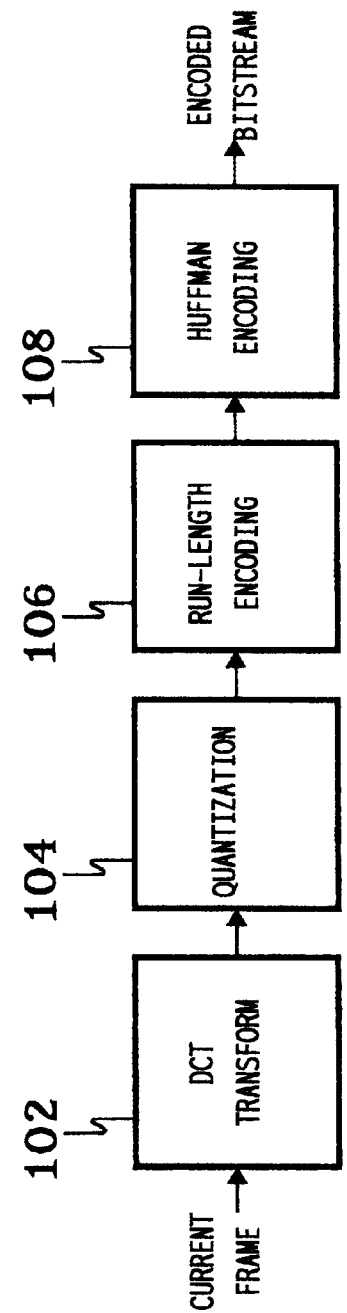
FIG. 1 shows a block diagram of the intra-encoding performed for I frames, according to the MPEG standards.
Figure 2:
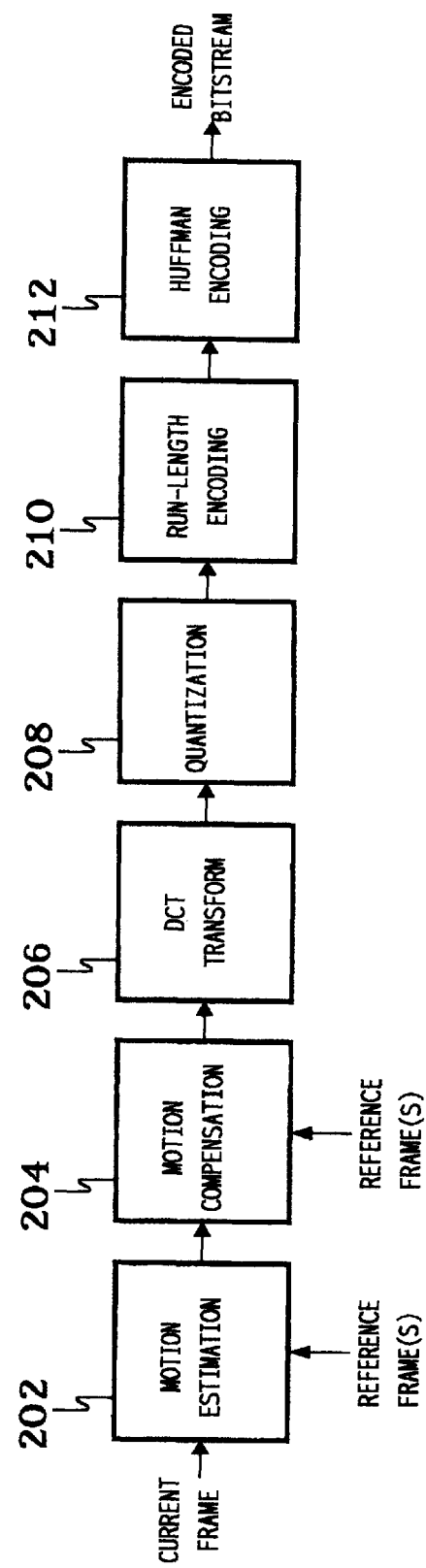
FIG. 2 shows a block diagram of the inter-encoding performed for P and B frames, according to the MPEG standards.
Figure 3:
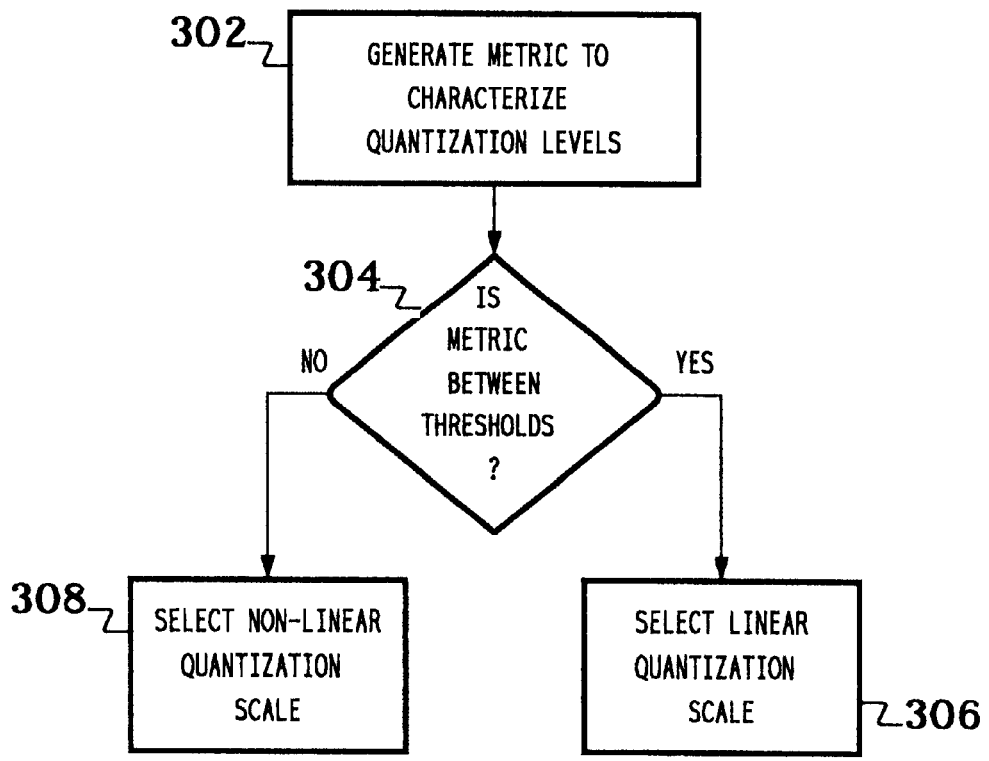
FIG. 3 shows a flow diagram of the processing performed to select the quantization scale to be used to encode the current frame during MPEG encoding of a video sequence, according to one embodiment of the present invention.

FIG. 3 shows a flow diagram of the processing performed to select the quantization scale to be used to encode the current frame during MPEG encoding of a video sequence, according to one embodiment of the present invention. In particular, the processing of FIG. 3 determines whether the quantization levels used to quantize the DCT coefficients for the current frame are to be selected from the set of quantization levels defined by the MPEG linear quantization scale or from the set of quantization levels defined by the MPEG non-linear quantization scale.

As shown in FIG. 3, a metric is generated to characterize quantization levels (step 302). In a preferred implementation, the metric is the average (Mqavg) of the quantization levels (mquant) used to quantize the DCT coefficients in the previously encoded frame. Those skilled in the art will understand that, for B frames which may be inter-encoded using either forward, backward, or bi-directional prediction, the previously encoded frame may actually correspond to a subsequent frame in the original video sequence. If the metric (e.g., the average quantization level Mqavg) is greater than a specified low threshold (Tlow) but less than a specified high threshold (Thigh) (step 304), then the linear quantization scale is selected for use in encoding the current frame (step 306). Otherwise, the non-linear quantization scale is selected for use in encoding the current frame (step 308). Steps 302-308 are repeated for each frame in the video sequence, where the first frame may be arbitrarily encoded using either the linear or the non-linear quantization scale.

In one implementation of the present invention, the same two values for the high and low thresholds are used for each frame, independent of whether the previous frame was encoded using either the linear quantization scale or the non-linear quantization scale and independent of whether the current and previous frames are I, P, or B frames. In that case, typical values for the low and high thresholds are 5 and 55, respectively.

In alternative implementations, the values used for the low and high thresholds may depend on whether the previous frame was encoded using the linear quantization scale or the non-linear quantization scale. For example, in the case where there is overhead for switching between scales, to achieve a degree of hysteresis for the processing, the value used for the high threshold for switching from the linear quantization scale to the non-linear quantization scale may be greater than the value used for the high threshold for switching from the non-linear quantization scale back to the linear quantization scale. Analogous different values could also be used for the low thresholds for those two transitions. Moreover, the values used for the low and high thresholds may depend on whether the current frame is an I, P, or B frame and/or whether the previous frame is an I, P, or B frame.

In general, for a given application, high-difficulty sequences (e.g., sequences with a lot of random motion and/or many scene changes) tend to be encoded using high quantization levels, while low-difficulty sequences (e.g., sequences with long scenes having little or steady motion) tend to be encoded using low quantization levels. Based on the processing of FIG. 3, the linear quantization scale will tend to be selected more for medium-difficulty sequences that use intermediate quantization levels, while the non-linear quantization scale will tend to be selected more for low-difficulty sequences that use low quantization levels and for high-difficulty sequences that use high quantization levels.

The inventors have found that the linear quantization scale tends to provide better results than the non-linear quantization scale for medium-difficulty sequences, while the non-linear quantization scale tends to provide better results than the linear quantization scale for low- and high-difficulty sequences. In particular, the present invention helps to reduce the occurrence of panic modes (buffer underflow or overflow), the remedy for which involves dropping frames of data or DCT coefficients when target bit rates are not achieved. In addition, the present invention improves picture quality in terms of peak signal to noise ratio (PSNR) for most normal video sequences.

In the processing shown in FIG. 3, the selection of the quantization scale for the current frame is based on the average quantization level for the previous frame. In alternative embodiments of the present invention, a metric other than a straight average may be used to select the quantization scale. For example, the median or a weighted average of the quantization levels could be used. Furthermore, the metric may be based on more than just the previous frame to base the metric on a longer history. In addition, the metric can be tracked separately for different frame types (e.g., I, P, B). Accordingly, depending on the implementation, the selection of the quantization scale for the current frame may be based on a metric from respective or non-respective previous frame(s).

Moreover, the processing of FIG. 3 assumes that the quantization levels used for the previous frame will provide a good prediction of the quantization levels that should be used for the current frame. This may not be true, especially during scene changes or high degrees of motion within the video sequence. An alternative implementation of the present invention involves a two-pass algorithm in which, during the first pass, quantization levels are selected for the current frame based on the quantization scale used during the previous frame. The average (or other suitable metric) of those quantization levels is then compared to the high and low thresholds to determine whether to perform a second pass at processing the current frame using the other quantization scale.

Although the present invention has been described in the context of processing in which the generated quantization level metric is compared to two different thresholds (i.e., a high threshold and a low threshold), those skilled in the art will understand that the present invention can be implemented using alternative processing in which the generated metric is compared to a single threshold in order to select the quantization scale. For example, in one possible implementation, if the generated metric is less than a threshold corresponding roughly to the high threshold Thigh, then the linear quantization scale is selected; otherwise, the non-linear quantization scale is selected. In another possible implementation, if the generated metric is greater than a threshold corresponding roughly to the low threshold Tlow, then the linear quantization scale is selected; otherwise, the non-linear quantization scale is selected. Of course, these different implementations can be effectively achieved using the preferred two-threshold processing by appropriate selection of either the high or low threshold value.

Although the present invention has been described in the context of MPEG encoding, those skilled in the art will understand that the present invention can be applied in the context of other video compression algorithms that provide two (or more) different quantization scales. In general, when there are two (or more) different quantization scales, they need not be one linear and the other non-linear as in case of the MPEG standards; they may be both linear or both non-linear, as long as they define different sets of available quantization levels.

Similarly, although the present invention has been described in the context of encoding video frames, those skilled in the art will understand that the invention can also be applied in the context of encoding video fields. As such, the term "frame," especially as used in the claims, is intended to cover applications for both video frames and video fields.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for encoding frames of a video sequence, comprising the steps of:
    (a) generating a metric characterizing quantization levels corresponding to a set of image data in the video sequence;
    (b) comparing the metric to one or more specified thresholds to select a quantization scale for a current frame in the video sequence; and
    (c) encoding the current frame using the selected quantization scale, wherein:
    the quantization scale is one of a linear quantization scale and a non-linear quantization scale;
    the linear quantization scale represents a set of quantization levels forming a linear progression; and
    the non-linear quantization scale represents a set of quantization levels forming a non-linear progression, wherein step (b) comprises the steps of:
    (1) comparing the metric to a low threshold and to a high threshold; and
    (2) selecting a first quantization scale, if the metric is between the low and high thresholds; otherwise, selecting a second quantization scale.

2. The invention of claim 1, wherein step (a) comprises the step of generating the metric based on the quantization levels used to encode a previously encoded frame in the video sequence.

3. The invention of claim 2, wherein the metric is an average quantization level for the previously encoded frame.

4. The invention of claim 2, wherein the one or more specified thresholds are independent of the quantization scale used to encode the previously encoded frame.

5. The invention of claim 2, wherein the one or more specified thresholds are dependent on the quantization scale used to encode the previously encoded frame.

6. The invention of claim 5, wherein the dependence of the one or more specified thresholds on the quantization scale used to encode the previously encoded frame achieves a degree of hysteresis for the method.

7. The invention of claim 2, wherein the one or more specified thresholds are independent of whether the previously encoded frame is an I, P, or B frame.

8. The invention of claim 2, wherein the one or more specified thresholds are dependent on whether the previously encoded frame is an I, P, or B frame.

9. The invention of claim 1, wherein step (a) comprises the step of generating the metric based on quantization levels selected during a first pass of processing for the current frame.

10. The invention of claim 8, wherein the selected quantization scale is used during a second pass of processing for the current frame.

11. The invention of claim 10, wherein the quantization scale used for the first pass is the quantization scale used to encode a previously encoded frame in the video sequence.

12. The invention of claim 1, wherein the first quantization scale has a dynamic range smaller than the second quantization scale.

13. The invention of claim 12, wherein the first quantization scale is an MPEG linear quantization scale and the second quantization scale is an MPEG non-linear quantization scale.

14. The invention of claim 1, wherein step (c) comprises the step of selecting one or more quantization levels in the selected quantization scale for quantizing DCT coefficients for the current frame.

15. The invention of claim 1, wherein the one or more specified thresholds are independent of whether the current frame is an I, P, or B frame.

16. The invention of claim 1, wherein the one or more specified thresholds are dependent on whether the current frame is an I, P, or B frame.

17. The invention of claim 1, wherein:
step (a) comprises the step of generating the metric based on the quantization levels used to encode a previously encoded frame in the video sequence, wherein the metric is an average quantization level for the previously encoded frame;
the first quantization scale is an MPEG linear quantization scale and the second quantization scale is an MPEG non-linear quantization scale; and
step (b) comprises the step of selecting one or more quantization levels in the selected quantization scale for quantizing DCT coefficients for the current frame.

18. The invention of claim 1, wherein the metric is generated from the quantization levels corresponding to the set of image data in the video sequence.

19. The invention of claim 1, wherein:
the linear quantization scale comprises 31 quantization levels consisting of 2 to 62 in increments of 2; and
the non-linear quantization scale comprises 31 quantization levels consisting of 1 to 8 in increments of 1, 8 to 24 in increments of 2, 24 to 56 in increments of 4, and 56 to 112 in increments of 8.

20. An apparatus for encoding frames of a video sequence, comprising:
(a) means for generating a metric characterizing quantization levels corresponding to a set of image data in the video sequence;
(b) means for comparing the metric to one or more specified thresholds to select a quantization scale for a current frame in the video sequence; and
(c) means for encoding the current frame using the selected quantization scale, wherein:
the quantization scale is one of a linear quantization scale and a non-linear quantization scale;
the linear quantization scale represents a set of quantization levels forming a linear progression; and
the non-linear quantization scale represents a set of quantization levels forming a non-linear progression, wherein means (b) comprises:
(1) means for comparing the metric to a low threshold and to a high threshold; and
(2) means for selecting a first quantization scale, if the metric is between the low and high thresholds; otherwise, selecting a second quantization scale.

21. A machine-readable medium, having encoded thereon program code, wherein, when the program code is executed by a machine, the machine implements a method for encoding frames of a video sequence, comprising the steps of:
(a) generating a metric characterizing quantization levels corresponding to a set of image data in the video sequence;
(b) comparing the metric to one or more specified thresholds to select a quantization scale for a current frame in the video sequence; and
(c) encoding the current frame using the selected quantization scale, wherein:
the quantization scale is one of a linear quantization scale and a non-linear quantization scale;
the linear quantization scale represents a set of quantization levels forming a linear progression; and
the non-linear quantization scale represents a set of quantization levels forming a non-linear progression, wherein step (b) comprises the steps of:
(1) comparing the metric to a low threshold and to a high threshold; and
(2) selecting a first quantization scale, if the metric is between the low and high thresholds; otherwise, selecting a second quantization scale.

22. A method for encoding frames of a video sequence, comprising the steps of:
(a) generating a metric characterizing quantization levels corresponding to a set of image data in the video sequence;
(b) comparing the metric to one or more specified thresholds to select a quantization scale for a current frame in the video sequence; and
(c) encoding the current frame using the selected quantization scale, wherein step (b) comprises the steps of:
(1) comparing the metric to a low threshold and to a high threshold; and
(2) selecting a first quantization scale, if the metric is between the low and high thresholds; otherwise, selecting a second quantization scale.

23. The invention of claim 22, wherein the first quantization scale has a dynamic range smaller than the second quantization scale.

24. The invention of claim 23, wherein the first quantization scale is an MPEG linear quantization scale and the second quantization scale is an MPEG non-linear quantization scale.

* * * * *

UNITED STATES PATENT AND TRADEMARK OFFICE
CERTIFICATE OF CORRECTION

PATENT NO. : 6,765,962 B1  
DATED : July 20, 2004  
INVENTOR(S) : Jungwoo Lee and Nurit Binenbaum It is certified that error appears in the above-identified patent and that said Letters Patent is hereby corrected as shown below:

Column 6,
Line 62, replace "claim 8" with -- claim 9 --.

Signed and Sealed this

Twenty-first Day of September, 2004

JON W. DUDAS
*Director of the United States Patent and Trademark Office*